(No Model.)
T. HIBBS.
NUT LOCK.
No. 483,921. Patented Oct. 4, 1892.
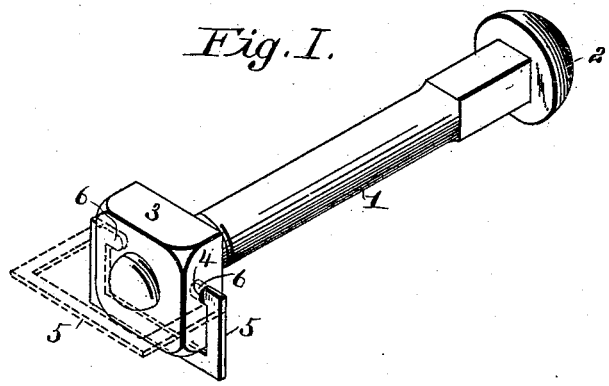
Fig. I.
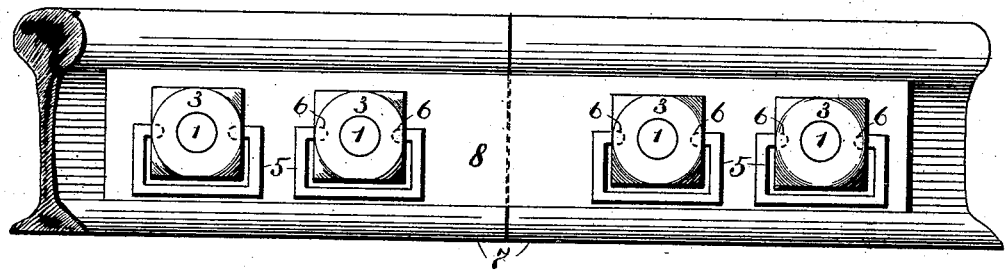
Fig. II.
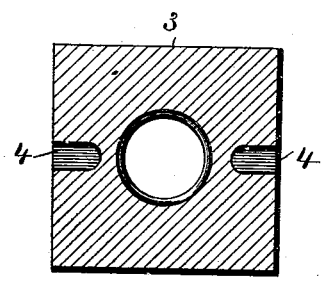
Fig. III.
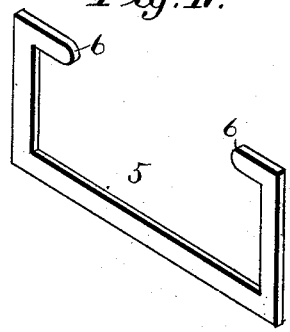
Fig. IV.
Witnesses:
F. G. Fischer
George E. Cruse
Inventor:
Thomas Hibbs.
By Knight Bros.
Attys.

UNITED STATES PATENT OFFICE.

THOMAS HIBBS, OF OSAGE CITY, KANSAS.

NUT-LOCK.

SPECIFICATION forming part of Letters Patent No. 483,921, dated October 4, 1892.

Application filed November 27, 1891. Serial No. 413,253. (No model.)

*To all whom it may concern:*

Be it known that I, THOMAS HIBBS, of Osage City, in the county of Osage and State of Kansas, have invented certain new and useful Improvements in Nut-Locks, of which the following is a full, clear, and exact description, reference being had to the accompanying drawings, which form a part of this specification.

My invention relates to certain new and useful improvements in nut-locks; and it consists in certain features of novelty hereinafter described, and pointed out in the claims.

Figure I is a perspective view of a bolt and nut, showing my improved nut-lock secured thereto. Fig. II is a side elevation showing my improved nut-lock connected with a railroad rail. Fig. III is an enlarged cross-section of one of my improved nuts. Fig. IV is a perspective of the clamp.

Referring to the drawings, 1 represents a bolt, 2 its head, and 3 the nut upon the same. The nut 3 is provided with openings 4 in its sides extending partially through the same and in which my improved clamp engages.

5 represents my improved bail-shaped clamp formed with inturned portions 6, which engage in the openings 4 of the nut, by means of which it is hinged thereto. The sides of the clamping-bail extend at right angles to the bottom portion, and the bail is adapted to be folded down over the nut, as shown in Figs. I and II, the sides and bottom portion thereof running parallel with the sides of the nut when in that position.

The clamp 5 may be made of spring-steel or other suitable metal having a certain amount of spring to it in order to spread the portions 6 slightly apart, in order to insert them in the openings 4.

7 represents two sections of a meeting-rail, and 8 a fish-plate.

Where my nut-lock is used in connection with railroad-rails and fish-plates, the clamp 5 is sprung slightly apart and inserted in the openings 4 of the nut 3 and then turned down under the nut, as shown in Fig. II, from the position shown in the dotted lines, Fig. I. If the nut should start to turn, the lower face of clamp 5 will come in contact with the base of the rail and the nut will be prevented from turning.

I claim as my invention—

1. The combination of a bolt, a nut thereon, and a clamp hinged to said nut and adapted to fold down over the sides thereof and engage a stop to prevent the nut from unscrewing, substantially as set forth.

2. In a nut-lock, the combination of a bolt, a nut thereon provided with openings 4 in its sides, and a spiring clamping-bail engaging said openings 4 of the nut and adapted to be turned down into engagement with a stationary stop to prevent the nut from unscrewing, substantially as set forth.

3. In a nut-lock, the combination of a bolt, a nut thereon formed with openings in its sides, and a clamp of substantially bail shape formed with inturned ends engaging the openings in the sides of the nut, said clamp being adapted to turn down over the sides of the nut and engage a stop to prevent the nut from unscrewing, substantially as set forth.

THOMAS HIBBS.

Witnesses:
C. P. FELCH,
GEORGE ROGERS.